United States Patent [19]
Takagi et al.

[11] Patent Number: 5,865,704
[45] Date of Patent: Feb. 2, 1999

[54] HYDRAULIC CONTROLLER FOR AUTOMATIC TRANSMISSION USE

[75] Inventors: Akira Takagi, Oobu; Shinya Sakaguchi, Kariya; Kazushi Nakatani, Oobu, all of Japan

[73] Assignee: Denso Corporation, Kariya, Japan

[21] Appl. No.: 778,259

[22] Filed: Jan. 8, 1997

[30] Foreign Application Priority Data

Jan. 9, 1996 [JP] Japan .................................. 8-001228

[51] Int. Cl.⁶ .......................... B60K 41/22; F16H 61/44
[52] U.S. Cl. ............................................. 477/62; 192/3.3
[58] Field of Search ................... 477/62, 79, 81; 192/3.3

[56] References Cited

U.S. PATENT DOCUMENTS

| | | | |
|---|---|---|---|
| 3,719,093 | 3/1973 | Edmonds | 477/62 |
| 4,843,920 | 7/1989 | Hayasaki et al. | 477/62 |
| 4,876,923 | 10/1989 | Crandall et al. | 477/62 |
| 4,996,894 | 3/1991 | Holbrook et al. | 477/62 |
| 5,085,103 | 2/1992 | Ando et al. | |
| 5,090,271 | 2/1992 | Hayasaki | |

FOREIGN PATENT DOCUMENTS

| | | |
|---|---|---|
| 5-10430 | 1/1993 | Japan . |
| 6-26568 | 2/1994 | Japan . |

*Primary Examiner*—Charles A. Marmor
*Assistant Examiner*—Sherry Lynn Estremsky
*Attorney, Agent, or Firm*—Pillsbury Madison & Sutro LLP

[57] ABSTRACT

To provide a hydraulic controller for automatic transmission use which commonalizes a lockup control valve and a friction engagement element control valve, thereby simplifying a hydraulic circuit, reducing the number of parts, and achieving low cost, a lockup solenoid to control engagement or release of a lockup clutch, a first friction engagement element to engage an friction engagement element only in a portion or entirety of a shifting stage to prohibit lockup, and a manual shift lever to determine whether a vehicle exists in a lockup prohibition condition are provided. A switching valve selectively switches the lockup solenoid to either communicate with the lockup clutch or communicate with the foregoing first friction engagement element. The manual shift valve is disposed in a path extending from the switching valve to the first friction engagement element.

13 Claims, 6 Drawing Sheets

HYDRAULIC CONTROLLER FOR AUTOMATIC TRANSMISSION USE

CROSS-REFERENCE TO RELATED APPLICATION

The present application is related to and claims priority from Japanese Patent Application No. Hei 8-1228, incorporated herein by reference.

BACKGROUND OF THE INVENTION

1. Field of the Invention

This invention relates to a hydraulic controller for automatic transmission use to control gear changing in a gearbox of an automatic transmission by hydraulic pressure.

2. Description of Related Art

An automatic transmission widely utilized in vehicles and the like performs gear changing control by switching, with a hydraulic valve, hydraulic pressure applied to several friction engagement devices to smoothly convey rotational driving force in accordance with load. Gear changing control is performed by manual operation by a rider to select either forward, neutral, or reverse by a select lever, or by automatic transmission to determine an engaged state of a friction engagement device so that a suitable gear ratio is obtained by an engine controlling computer from throttle opening or the like of the engine.

A torque converter to convey motive power of an engine to a gearbox with fluid as a medium in an input side of such a hydraulic controller for automatic transmission use according to the prior art is known. Because this torque converter employs fluid as a medium, vibrational shock can be absorbed, and there exists a function as a startoff device which permits suitable slippage and prevents engine stalls. Because the torque converter is inherently a slippage element, loss of motive power is unavoidable. In this regard, direct coupling of an input shaft to an output shaft (termed "lockup") is performed to improve the fuel consumption performance of the vehicle. This direct coupling of the input shaft to the output shaft (lockup) is not performed in the state of a first speed which is a low speed range. switching lockup on and off is generally performed by a solenoid to switch lockup on and off.

As a method for implementing this hydraulic controller in a simple manner, a structure jointly using a solenoid for lockup control use and a solenoid for use of friction engagement elements such as a brake, a clutch, and the like is disclosed in Japanese Patent Application Laid-Open Nos. Hei 6-26568 and 5-10430.

The system disclosed in the foregoing Japanese Patent Application Laid-Open No. 6-26568 jointly uses a duty solenoid to control a slip ratio of slip control of a lockup device in an engagement control switching valve of a low reverse brake. That is to say, a solenoid for lockup control use substitutes for engagement control of friction engagement elements operating outside a lockup region.

The system disclosed in Japanese Patent Application Laid-Open No. Hei 5-10430 causes the hydraulic systems and valve systems for two friction engagement elements which are not simultaneously supplied with hydraulic pressure, that is, which do not operate simultaneously, to be commonalized.

However, problem points such as the following exist in a hydraulic circuit for automatic transmission use disclosed in the foregoing publications commonalizing the above-described solenoid for lockup control use and solenoid for friction engagement element control use:

because the duty solenoid valve for controlling the slip ratio of lockup slip control becomes the pilot valve of the solenoid for lockup control use and the solenoid for friction engagement element control use, the number of parts is large and the hydraulic circuit is complex;

because the switching device of the communicated destination of the foregoing duty solenoid valve is an on-off solenoid, the number of parts increases and the hydraulic circuit becomes complex, and current consumption increases, due to employment of a special solenoid; and when the lockup shift valve sticks or the on-off solenoid is locked, output pressure of the duty solenoid valve acts upon the lockup controller via a differential pressure control valve (i.e., the lockup control valve 50 disclosed in Japanese Patent Application Laid-Open No. Hei 6-26568), and so vehicle travel may be impeded.

SUMMARY OF THE INVENTION

In light of problems such as these, it is an object of the present invention to provide a hydraulic controller for automatic transmission use which commonalizes a lockup control valve and a friction engagement element control valve and simplifies a hydraulic circuit, reduces the number of parts, and achieves low cost through this commonalization by jointly utilizing a device for determining a lockup prohibition condition known as a manually operated valve and a device for switching communicating passages.

It is another object of this invention to provide a hydraulic controller for automatic transmission use having a high degree of safety for avoiding inoperative vehicle travel even when a mechanical valve or solenoid has failed.

These objects are achieved according to a first aspect of the present invention by providing a system in which lockup and friction engagement elements are directly controlled by a common solenoid, and so the number of parts is reduced and the hydraulic circuit is simplified. Because determination of lockup prohibition is performed by a manual valve, a special solenoid becomes unnecessary, and the number of parts is reduced, the hydraulic circuit is simplified, and current consumption is alleviated.

Further, because a switching device is provided which switches selectively when performing control of lockup and control of a friction engagement element, even if a failure occurs in a mechanical valve other than a solenoid, the failed mechanical valve does not adversely affect other components, and so safety can be assured. A simple hydraulic circuit with high saftey can be provided by causing a single manual valve to double in use as a device for determining a lockup prohibition condition and a switching device. Moreover, other than a clutch, the friction engagement element may be a brake or the like. A switching device for switching hydraulic pressure in a hydraulic chamber of the friction engagement element to high pressure or low pressure employs, for example, a spool switching valve and an on-off solenoid, but another valve device can be employed in substitution for the spool switching valve.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 4 is a chart showing a lockup prohibition region of the first embodiment;

DETAILED DESCRIPTION OF THE PRESENTLY PREFERRED EXEMPLARY EMBODIMENTS

Figure 3:
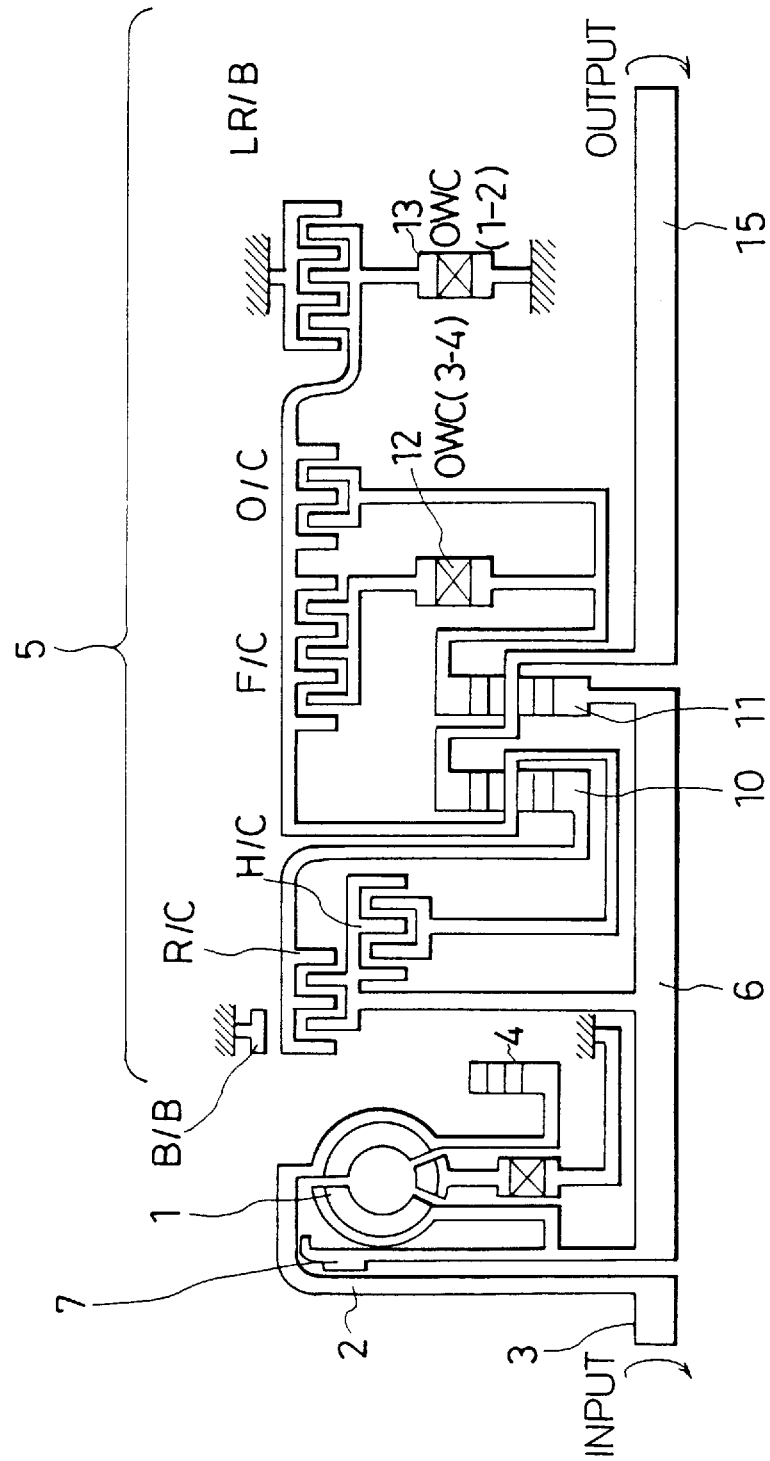
FIG. 3 shows friction engagement elements, one-way clutches, and a torque converter of an automatic transmission according to the first embodiment.

A first preferred embodiment of the present invention will be described with reference to the drawings, in which FIG. 3 shows the mechanical structure of an automatic transmission and a torque converter on an input shaft side thereof according to the first embodiment.

In a torque converter 1, a cover 2 on an input shaft side thereof is interconnected with a drive shaft 3 of an engine. In an automatic transmission 5, an input shaft 6 thereof can be engaged with or release from the engine side drive shaft 3 using a clutch 7. During interconnection of the engine side drive shaft 3 and the automatic transmission side input shaft 6 by the clutch 7, lockup (direct coupling) is on. At this time, the engine side output shaft 3 and the automatic transmission side input shaft 6 are directly coupled without intermediation by the torque converter 1. Hydraulic fluid discharged by a pump 4 is supplied to the torque converter 1.

The automatic transmission 5 is linked to an output shaft 15 via several clutches R/C, H/C, F/C, and O/C, several brakes B/B and LR/B, a rear side planetary gear 10, a front side planetary gear 11, and one-way clutches 12 and 13 as friction engagement elements. A predetermined gear ratio of the input shaft 6 and the output shaft 15 is obtained by selecting engagement or release of the clutches R/C, H/C, F/C, and O/C and the brakes B/B and LR/B. Hydraulic switching of the torque converter 1 as well as switching of the several clutches and the several brakes are controlled by the hydraulic circuit shown in FIG. 5.

The clutches are a band brake B/B, an overrunning clutch O/C, a high clutch H/C, a reverse clutch R/C, a low reverse brake LR/B, and a forward clutch F/C.

Figure 5:
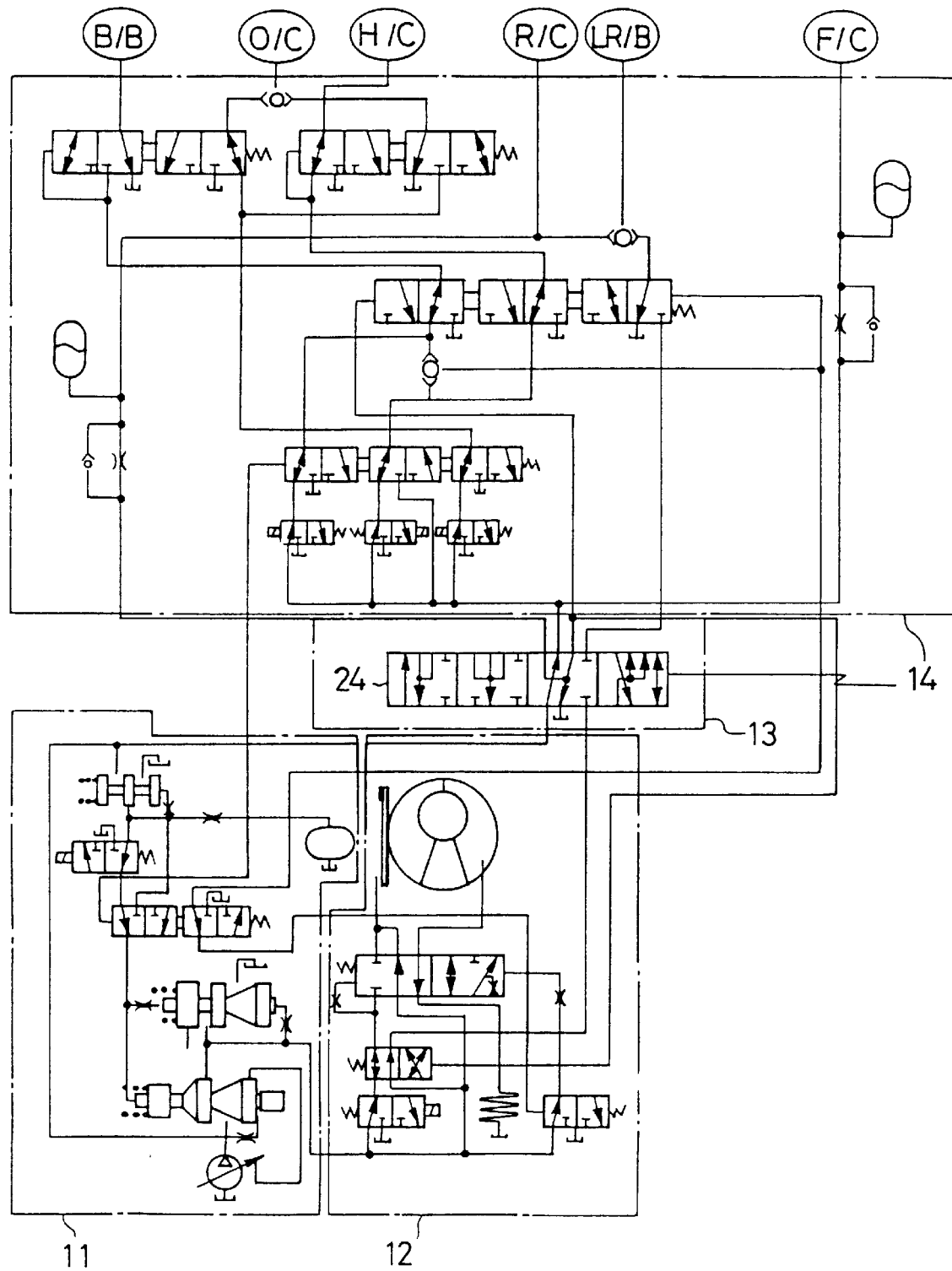
FIG. 5 is a hydraulic circuit diagram of the first embodiment.

In FIG. 5, fundamentally, line pressure controlled by a line pressure control circuit 14 is supplied to a lockup control circuit 15, and output pressure output from this lockup control circuit 15 passes through a manual shift control circuit 16, also passes through an automatic shift control circuit 17, and is supplied to the brakes and clutches. The determination from the shift control circuit 17 is reflected by the lockup control circuit 15.

Figure 1:
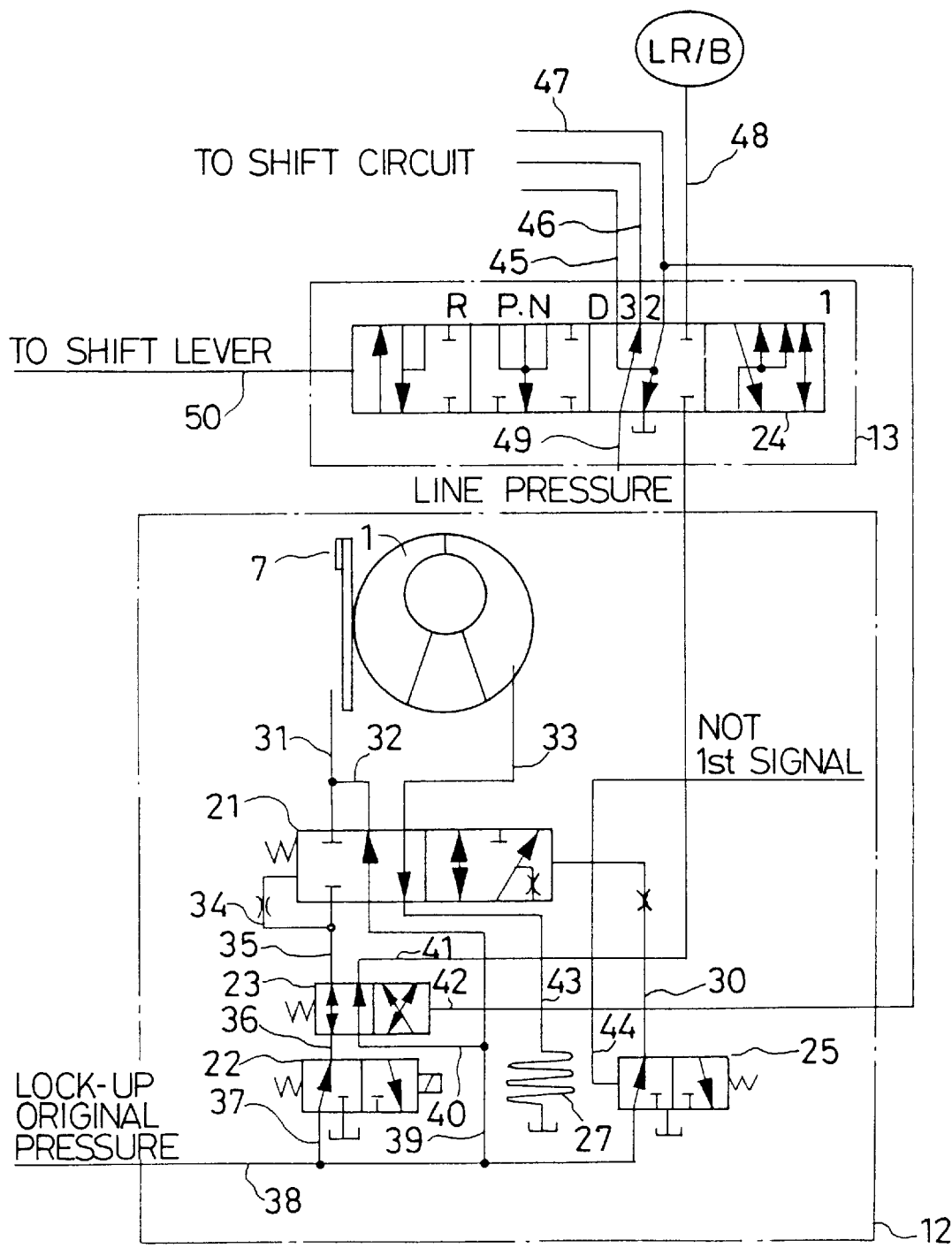
FIG. 1 shows a first preferred embodiment of a hydraulic controller for automatic transmission use according to the present invention.

Next, FIG. 1 indicates a hydraulic circuit corresponding to a major portion of this invention, including the lockup control circuit 15 and the manual shift control circuit 16.

In FIGS. 1 and 3, in a case where motive power of the engine side output shaft 3 is conveyed to the input shaft of the automatic transmission 5 side, there is intermittence due to the lockup clutch 7 of the torque converter 1, except when directly coupled. Engagement or release of the lockup clutch 7 is switched by a lockup relay valve 21. The state indicated in FIG. 1 is with lockup off. A switching valve 23 selectively switches to the lockup relay valve 21 or a manual shift valve 24. A lockup prohibition valve 25 is a solenoid to prevent lockup collect engagement at a first speed. An oil cooler 27 performs heat exchange to cool hydraulic oil, and the low reverse brake LR/B is one of the friction engagement elements controlling shifting of the automatic transmission, as shown in FIG. 5. Reference numerals 30 through 49 denote communicating passages which have oil flowing therethrough. Additionally, the manual shift valve 24 of the manual shift control circuit 13 is driven by a link 50 interconnected with a manual shift lever.

The communicating passage 38 communicates with lockup original pressure for lockup clutch engagement, and communicates with line pressure sent to a friction engagement element for shifting.

The communicating passages 45, 46, and 47 are connected to the automatic shift control circuit 16. The communicating passage 44 is connected to a non-first speed signal, and is supplied with low pressure when at a first speed or with high pressure when at other than the first speed. FIG. 1 shows a state where the shift lever, in a shifting stage of a second speed or more, is in the "D" range, or the "2" range, or the "3" range.

Effects of this embodiment will be described next. In FIG. 1, when a lockup solenoid 22 is positioned to output a pressure which is only slightly smaller than the lockup original pressure, the lockup relay valve 21 is moved to the left to maintain a balance of power, due to pressure of the communicating passage 34 dropping slightly. Thereupon, the communicating passage 35 is connected to the communicating passage 31, and a lockup state can be controlled by output pressure of the solenoid 22. At this time, the non-first speed signal is high pressure and assumes a lockup permitted state, and the lockup prohibition valve 25 is positioned to the right. Additionally, it is necessary for the range signal, that is, pressure of the communicating passage 42, to become low pressure, that is, lockup permitted range.

Figure 2:
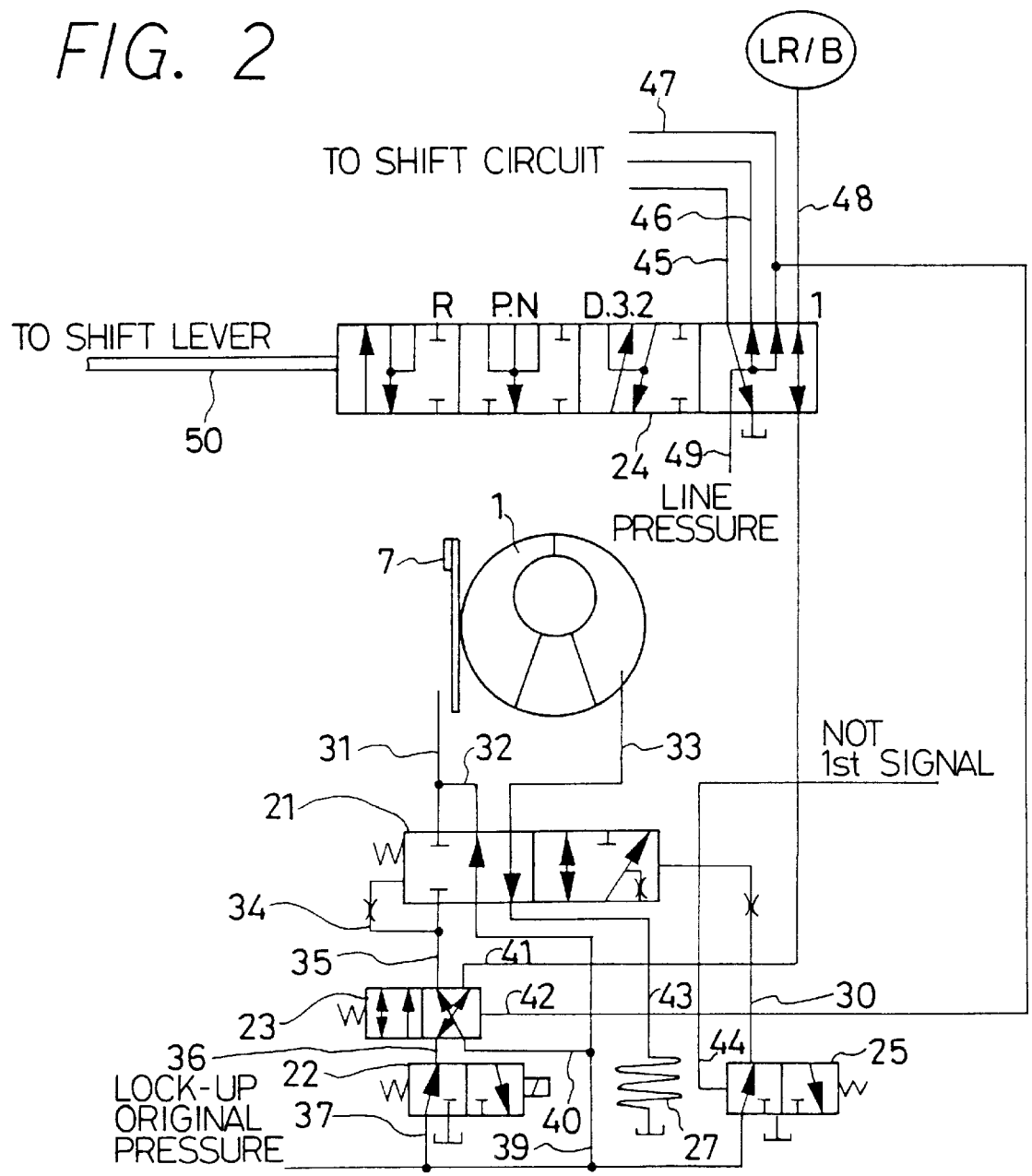
FIG. 2 shows a "1" range state of the hydraulic controller of FIG. 1.

When, for example, switching a range from this state, the state shown in FIG. 2 is obtained. That is, the manual shift valve 24 is moved to the left via the link 50 due to shift lever operation, and when established at the "1" range, pressure of the communicating passage 42 rises and the switching valve 23 is moved to the left. Thereupon, lockup mode pressure is supplied from the communicating passage 40 to the communicating passage 35, the lockup relay valve 21 is moved rightwardly, and a lockup clutch released state is obtained. Meanwhile, pressure of the lockup solenoid 22 passes from the communicating passage 36 through the communicating passage 41, is linked with the communicating passage 48 via the manual shift valve 24, and communicates with the low reverse brake LR/B, and engagement or release of the low reverse brake LR/B can be controlled by the lockup solenoid 22.

According to this embodiment, because pressure of the lockup solenoid 22 passes through the manual shift valve 24 and communicates therewith, breakdown does not occur even if a mechanical valve should fail. That is to say, even if the lockup solenoid 22 fails and high pressure is maintained, the low reverse brake LR/B which is a friction engagement element is not engaged unless manually moved to the "1" range.

In this embodiment, the low reverse brake LR/B which is a friction engagement element has an engine brake function, and can double in use as a solenoid while ensuring safety with substantially no breakdown in normal vehicle travel, even in a case wherein this friction engagement element is not in an engaged state.

FIG. 4 is a chart showing a lockup prohibition region of an automatic transmission. The slanted line portion is the lockup prohibition region.

TABLE I shows several ranges and the output state of the manual shift valve 24. A, B, C, and D correspond to A, B, C, and D of the communicating passages in FIG. 5. TABLE II is an engagement table of the friction engagement elements and the one-way clutch 12 in the automatic transmission shown in FIG. 3. In TABLE II, a check mark indicates engagement and no check mark indicates release. Also, the asterisk denotes a position used for overrun prevention.

TABLE I

|         | A | B | C | D |
|---------|---|---|---|---|
| R       | ✓ |   |   |   |
| P, N    |   |   |   |   |
| D, 3, 2 |   | ✓ |   |   |
| 1       |   | ✓ | ✓ | ✓ |

TABLE II

|       | R/C | B/B | H/C | F/C | OWC/ 3-4 | O/C | LR/B | OWC 1-2 |
|-------|-----|-----|-----|-----|----------|-----|------|---------|
| P     |     |     |     |     |          |     |      |         |
| R     | ✓   |     |     |     |          |     | ✓    |         |
| N     |     |     |     |     |          |     |      |         |
| D     |     |     |     |     |          |     |      |         |
| Sp. 1 |     |     |     | ✓   | ✓        |     |      | ✓       |
| Sp. 2 |     | ✓   |     | ✓   | ✓        |     |      |         |
| Sp. 3 |     | ✓   | ✓   | ✓   | ✓        |     |      |         |
| Sp. 4 |     | ✓   | ✓   | ✓   |          |     |      |         |
| 3     |     |     |     |     |          |     |      |         |
| Sp. 1 |     |     |     | ✓   | ✓        |     |      | ✓       |
| Sp. 2 |     | ✓   |     | ✓   | ✓        |     |      |         |
| Sp. 3 |     |     | ✓   | ✓   | ✓        | ✓   |      |         |
| 2     |     |     |     |     |          |     |      |         |
| Sp. 1 |     |     |     | ✓   | ✓        | ✓   |      | ✓       |
| Sp. 2 |     | ✓   |     | ✓   | ✓        | ✓   |      |         |
| Sp. 3 | *   |     | ✓   | ✓   | ✓        | ✓   |      |         |
| 1     |     |     |     |     |          |     |      |         |
| Sp. 1 |     |     |     | ✓   | ✓        | ✓   | ✓    |         |
| Sp. 2 | *   | ✓   |     | ✓   | ✓        | ✓   |      |         |
| Sp. 3 | *   |     | ✓   | ✓   | ✓        | ✓   |      |         |

SECOND EMBODIMENT

Figure 6:
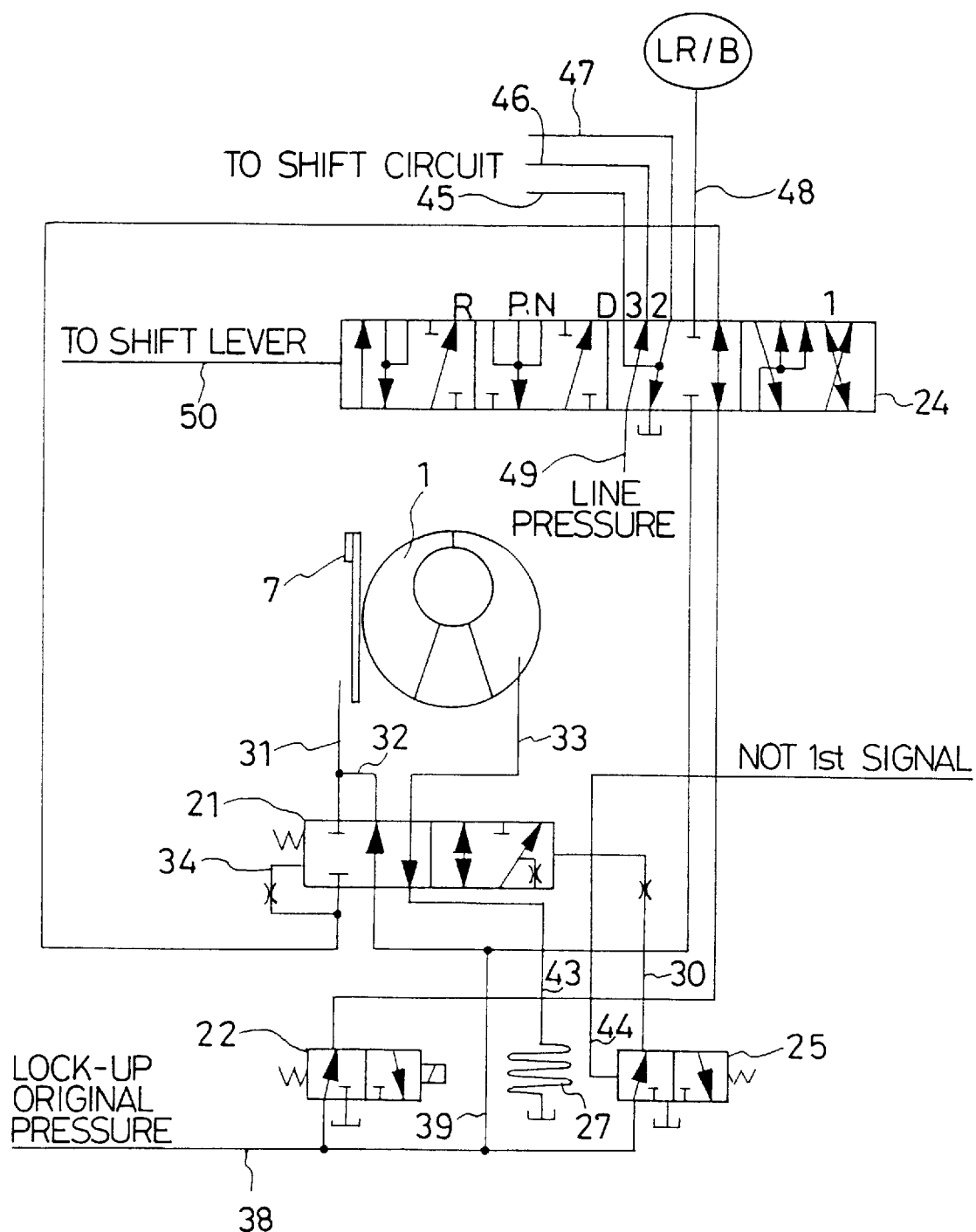
FIG. 6 shows a second embodiment of this invention.
Figure 7:
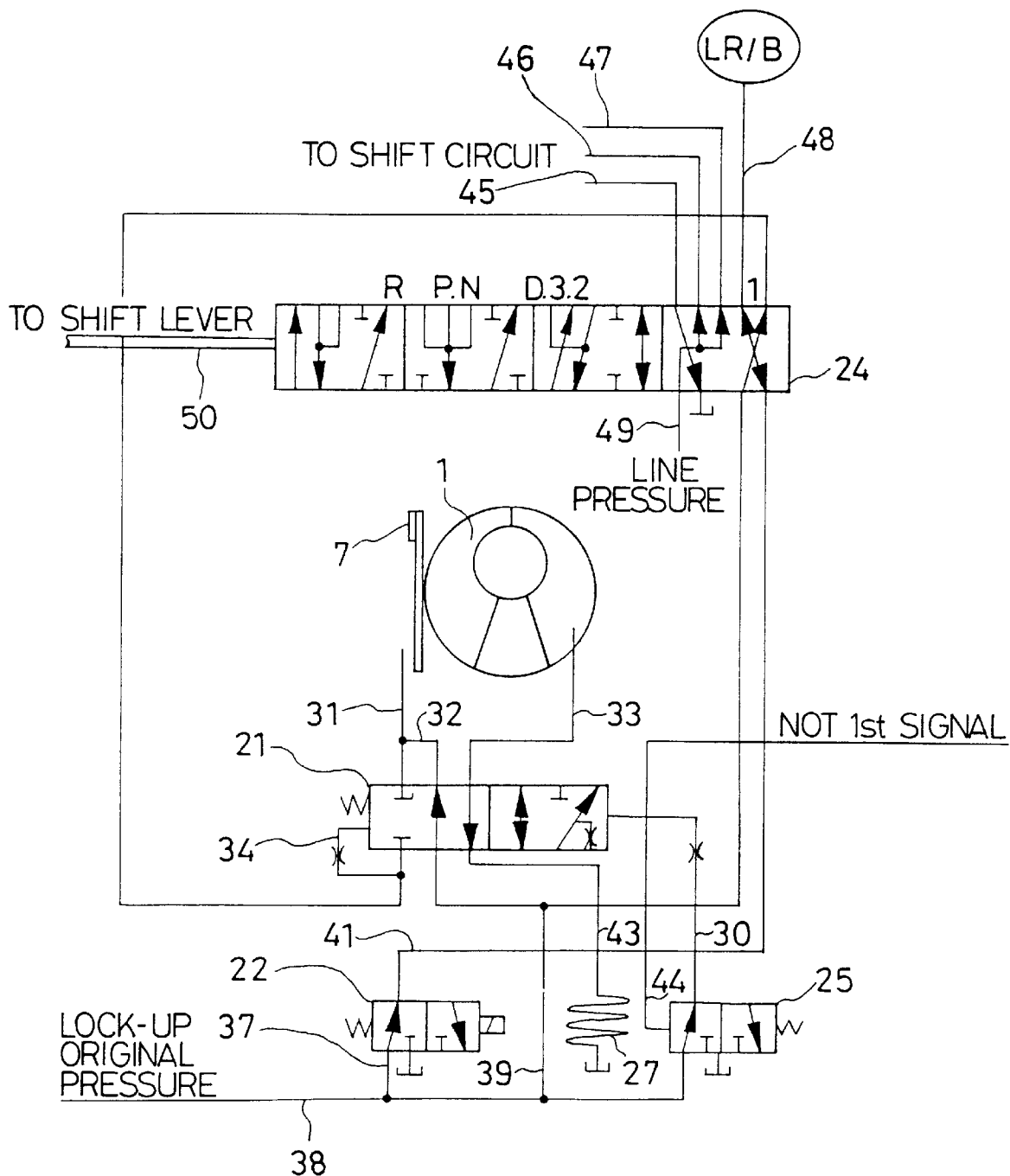
FIG. 7 shows a "1" range state of a manual shift valve of the second embodiment.

A second preferred embodiment of the present invention is shown in FIGS. 6 and 7.

The second embodiment shown in FIGS. 6 and 7 is an example where the hydraulic circuit has been simplified in comparison with the first embodiment. This embodiment commonalizes a lockup control valve and a friction engagement element control valve using a lockup solenoid 22, and simplifies a hydraulic circuit, reduces the number of parts, and achieves low cost through this commonalization by jointly utilizing, in a manual shift valve 24, a device for determining a lockup prohibition condition and a device for switching communicating passages. FIG. 6 shows a state of a "D," "3," or "2" range, and FIG. 7 shows a state of a "1" range; identical symbols are used in FIGS. 6 and 7 for structural portions which are substantially identical to FIG. 1.

The foregoing friction engagement element may be, other than a clutch, a brake or the like. A switching device for switching hydraulic pressure in a hydraulic chamber of the friction engagement element to high pressure or low pressure employs, for example, a spool switching valve and an on-off solenoid, but another valve device can be employed in place of the spool switching valve.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A hydraulic controller for automatic transmission use, said controller comprising:

a torque converter;

a lockup device disposed in parallel with said torque converter for directly conveying driving force;

a plurality of friction engagement elements for changing a shifting stage;

control means for controlling engagement and release of said lockup device, said plurality of friction engagement elements including a first friction engagement element which is engaged when an automatic transmission exists in a lockup prohibited condition;

a manual shift valve interlocked with a shift lever to determine whether a vehicle in which said automatic transmission is disposed is in said lockup prohibited condition; and switching means for selectively switching said control means to communicate with a lockup device and to communicate with said first friction engagement element in accordance with a determination result of said manual shift valve;

wherein said manual shift valve is disposed in a path extending from said switching means to said first friction engagement element.

2. The controller of claim 1, wherein said control means is an electrical hydraulic control valve for directly controlling said lockup device and said first friction engagement element.

3. An automatic transmission hydraulic controller, said controller comprising:

a hydraulic line for providing a source of hydraulic pressure;

a lockup valve connected to said hydraulic line;

a lockup unit for directly conveying motive power from an input shaft of said automatic transmission to an output shaft thereof;

a friction engagement section;

a switching valve connected to said lockup valve, said hydraulic line, said lockup unit and said friction engagement section, said lockup valve being for selectively connecting said switching valve to said hydraulic line and said switching valve being for selectively connecting said lockup valve to said lockup unit while connecting said hydraulic line to said friction engagement section and for selectively connecting said lockup valve to said friction engagement section while connecting said hydraulic line to said lockup unit; and a shift device disposed in a path between said friction engagement section and said switching valve to permit engagement of said friction engagement section, if said switching valve fails, only if said friction engagement section is manually moved to an engaged range.

4. An automatic transmission hydraulic controller, said controller comprising:

a hydraulic line for providing a source of hydraulic pressure;

a lockup valve connected to said hydraulic line;

a lockup clutch;

a torque converter;

a lockup relay valve;

a friction engagement element;

a switching valve for selectively connecting said lockup valve to said lockup relay valve and for selectively connecting said lockup valve to said friction engagement element;

wherein said lockup relay valve is for selectively connecting said hydraulic line to said lockup clutch and for selectively connecting said switching valve to said lockup clutch while connecting said hydraulic line to said torque converter.

5. The controller of claim 4, wherein said friction engagement element is a low reverse brake.

6. The controller of claim 4, wherein said shift valve is for connecting said lockup valve to said lockup relay valve when said transmission is in a non-lockup state.

7. The controller of claim 4, wherein said shift valve is for connecting said lockup valve to said friction engagement element when said transmission is in a lockup state.

8. An automatic transmission hydraulic controller, said controller comprising:

a hydraulic line for providing a source of hydraulic pressure;

a lockup valve connected to said hydraulic line;

a lockup unit for directly conveying motive power from an input shaft of said automatic transmission to an output shaft thereof, said lockup unit comprising a lockup clutch, a torque converter, and a lockup relay valve for selectively connecting said hydraulic line to said lockup clutch and for selectively connecting said switching valve to said lockup clutch while connecting said hydraulic line to said torque converter;

a friction engagement section;

a switching valve connected to said lockup valve, said hydraulic line, said lockup unit and said friction engagement section, said lockup valve being for selectively connecting said switching valve to said hydraulic line and said switching valve being for selectively connecting said lockup valve to said lockup unit while connecting said hydraulic line to said friction engagement section and for selectively connecting said lockup valve to said friction engagement section while connecting said hydraulic line to said lockup unit.

9. An automatic transmission hydraulic controller, said controller comprising:

a hydraulic line for providing a source of hydraulic pressure;

a lockup valve connected to said hydraulic line;

a lockup unit for directly conveying motive power from an input shaft of said automatic transmission to an output shaft thereof;

a friction engagement section comprising a friction engagement element and a shift valve for selectively connecting said switching valve to said friction engagement element;

a switching valve connected to said lockup valve, said hydraulic line, said lockup unit and said friction engagement section, said lockup valve being for selectively connecting said switching valve to said hydraulic line and said switching valve being for selectively connecting said lockup valve to said lockup unit while connecting said hydraulic line to said friction engagement section and for selectively connecting said lockup valve to said friction engagement section while connecting said hydraulic line to said lockup unit.

10. The controller of claim 9, wherein said shift valve is for connecting said switching valve to said friction engagement element when said transmission is in a non-lockup state.

11. The controller of claim 9, wherein said friction engagement element is a low reverse brake.

12. An automatic transmission hydraulic controller, said controller comprising:

a hydraulic line for providing a source of hydraulic pressure;

a lockup valve connected to said hydraulic line;

a lockup unit for directly conveying motive power from an input shaft of said automatic transmission to an output shaft thereof;

a friction engagement section;

a switching valve connected to said lockup valve, said hydraulic line, said lockup unit and said friction engagement section, said lockup valve being for selectively connecting said switching valve to said hydraulic line and said switching valve being for selectively connecting said lockup valve to said lockup unit while connecting said hydraulic line to said friction engagement section and for selectively connecting said lockup valve to said friction engagement section while connecting said hydraulic line to said lockup unit, said switching valve for connecting said hydraulic line to said friction engagement section when said transmission is in a non-lockup state.

13. An automatic transmission hydraulic controller, said controller comprising:

a hydraulic line for providing a source of hydraulic pressure;

a lockup valve connected to said hydraulic line;

a lockup unit for directly conveying motive power from an input shaft of said automatic transmission to an output shaft thereof;

a friction engagement section;

a switching valve connected to said lockup valve, said hydraulic line, said lockup unit and said friction engagement section, said lockup valve being for selectively connecting said switching valve to said hydraulic line and said switching valve being for selectively connecting said lockup valve to said lockup unit while connecting said hydraulic line to said friction engagement section and for selectively connecting said lockup valve to said friction engagement section while connecting said hydraulic line to said lockup unit, said switching valve for connecting said lockup valve to said friction engagement section and for connecting said hydraulic line to said lockup unit when said transmission is in a lockup state.

\* \* \* \* \*